United States Patent
Cunningham et al.

(10) Patent No.: US 10,877,199 B2
(45) Date of Patent: Dec. 29, 2020

(54) METHOD FOR MANUFACTURING A POLARIZER APPARATUS, POLARIZER APPARATUS, AND DISPLAY SYSTEM HAVING A POLARIZER APPARATUS

(71) Applicant: Applied Materials, Inc., Santa Clara, CA (US)

(72) Inventors: Kevin Cunningham, Mountain View, CA (US); Christopher Bencher, Cupertino, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 16/333,664

(22) PCT Filed: Oct. 12, 2016

(86) PCT No.: PCT/US2016/056565
§ 371 (c)(1),
(2) Date: Mar. 15, 2019

(87) PCT Pub. No.: WO2018/071012
PCT Pub. Date: Apr. 19, 2018

(65) Prior Publication Data
US 2019/0257991 A1    Aug. 22, 2019

(51) Int. Cl.
*G02F 1/1335* (2006.01)
*G02B 5/30* (2006.01)
(Continued)

(52) U.S. Cl.
CPC ......... *G02B 5/3058* (2013.01); *G02B 6/0055* (2013.01); *G02F 1/1368* (2013.01);
(Continued)

(58) Field of Classification Search
CPC combination set(s) only.
See application file for complete search history.

(56) References Cited

U.S. PATENT DOCUMENTS 5,991,075 A * 11/1999 Katsuragawa ....... G02B 5/3058
359/485.03
2006/0215263 A1    9/2006 Mi et al.
(Continued)

FOREIGN PATENT DOCUMENTS

WO    20080137188 A1    11/2008
WO    2016025830 A1    2/2016

OTHER PUBLICATIONS

International Search Report and Written Opinion for Application No. PCT/US2016/056565 dated Jun. 9, 2017.

*Primary Examiner* — James A Dudek
(74) *Attorney, Agent, or Firm* — Patterson + Sheridan, LLP

(57) ABSTRACT

A method for manufacturing a polarizer apparatus is described. The method includes forming a patterned resist structure having lines with a top surface and two or more side surfaces; depositing a conductive material over the patterned resist structure, wherein the conductive material is provided at the top surface and the two or more side surfaces, and wherein a layer structure is formed; and etching the layer structure to remove the conductive material from the top surface of the lines to form conductive lines of the conductive material at the two or more side surfaces.

13 Claims, 10 Drawing Sheets

(51) Int. Cl.
*F21V 8/00* (2006.01)
*G02F 1/1368* (2006.01)

(52) U.S. Cl.
CPC .. *G02F 1/133514* (2013.01); *G02F 1/133528* (2013.01); *G02F 1/133536* (2013.01); *G02F 2001/133548* (2013.01)

(56) References Cited

U.S. PATENT DOCUMENTS

2008/0137188 A1 6/2008 Sato et al.
2018/0224590 A1* 8/2018 Wang .................. G02B 5/1857

* cited by examiner

METHOD FOR MANUFACTURING A POLARIZER APPARATUS, POLARIZER APPARATUS, AND DISPLAY SYSTEM HAVING A POLARIZER APPARATUS

TECHNICAL FIELD

Embodiments of the present disclosure relate to a method for manufacturing a polarizer apparatus, a polarizer apparatus, and a display system having a polarizer apparatus. Embodiments of the present disclosure particularly relate to a method for manufacturing a polarizer apparatus having a double pattern wire array and apparatuses and systems resulting therefrom.

BACKGROUND

Flat panel displays such as liquid crystal displays (LCDs), plasma displays (PDPs), and organic light emitting diode displays (OLED displays) have replaced cathode ray tubes (CRTs). The liquid crystals of an LCD do not emit light themselves and utilize a backlight unit to supply light through the liquid crystals.

Existing liquid crystal displays (LCDs) modulate light by placing liquid crystals (LCs) between two optical polarizers of crossed (e.g., rotated 90 degrees relative to each other) polarization. A pixel or one color of a pixel, respectively, can be switched on or off depending on the state of the liquid crystal (LC) material, which may rotate the polarization of the photons between the two optical polarizers. The amount of rotation is determined by an electric field which is controlled by thin-film transistors (TFTs) fabricated within the LCD.

Optical polarizers array be absorptive. For example, more than 50% of the unpolarized light produced by the backlight of the LCD is absorbed by the first polarizer alone. Such arrangements essentially consume light, converting the energy into heal within the first polarizer and are therefore inefficient.

Wire grid polarizers, which are based on transmission and reflection, have a higher utilization rate of the light generated by a backlight unit. For example, electromagnetic waves having an electric field oriented orthogonal to the wires are transmitted through the polarizer. Light having electric field that is parallel to the wires is reflected or more precisely, radiated off of the wires. For covering the visible spectrum range, as for example utilized for displays, e.g. for an LCD, the feature sizes of the wire grid polarizer (WGP) are beneficially in a certain range.

In light of the above, it is beneficial to provide an improved method for manufacturing a polarizer apparatus, a polarizer apparatus, which is for example manufactured according to the improved method, and a display having a respective polarizer apparatus.

SUMMARY

According to one embodiment, a method for manufacturing a polarizer apparatus is provided. The method includes forming a patterned resist structure having lines with a top surface and two or more side surfaces; depositing a conductive material over the patterned resist structure, wherein the conductive material is provided at the top surface and the two or more side surfaces, and wherein a layer structure is formed; and etching the layer structure to remove the conductive material from the top surface of the lines to form conductive lines of the conductive material at the two or more side surfaces. Further, electrically coupling the conductive lines may also be included in some embodiments.

According to another embodiment, a polarizer apparatus is provided. The polarizer apparatus includes a wire array of optically reflective and electrically conductive lines with a top surface and two or more side surfaces, wherein the optically reflective and electrically conductive lines include at least a first conductive line and an adjacent second conductive line, wherein each of the first conductive line and the adjacent second conductive line have a first height of a first side surface of the two or more side surfaces, which is smaller than a second height of a second side surface of the two or more side surfaces, such that each of the first conductive line and the second conductive line are asymmetric, and wherein the first conductive line and the second conductive line form a symmetric pair of conductive lines.

According to a further embodiment, a display system is provided. The display system includes a first polarizer apparatus, particularly a first shielding reflective optical polarizer. The first polarizer apparatus includes a wire array of optically reflective and electrically conductive lines with a top surface and two or more side surfaces, wherein the optically reflective and electrically conductive lines include at least a first conductive line and an adjacent second conductive line, wherein each of the first conductive line and the adjacent second conductive line have a first height of a first side surface of the two or more side surfaces, which is smaller than a second height of a second side surface of the two or more side surfaces, such that each of the first conductive line and the second conductive line are asymmetric, and wherein the first conductive line and the second conductive line form a symmetric pair of conductive lines. The display system further includes a color filter disposed adjacent the first polarizer apparatus; a thin film transistor and liquid crystal layer disposed adjacent the color filter; and a second polarizer apparatus, particularly a second shielding reflective optical polarizer, wherein the second polarizer apparatus is disposed adjacent to the thin film transistor and liquid crystal layer. The second polarizer apparatus includes a wire array of optically reflective and electrically conductive lines with a top surface and two or more side surfaces, wherein the optically reflective and electrically conductive lines include at least a first conductive line and an adjacent second conductive line, wherein each of the first conductive line and the adjacent second conductive line have a first height of a first side surface of the two or more side surfaces, which is smaller than a second height of a second side surface of the two or more side surfaces, such that each of the first conductive line and the second conductive line are asymmetric, and wherein the first conductive line and the second conductive line form a symmetric pair of conductive lines. The display system further includes a backlight assembly including a light source, a diffuser and a back reflector, the backlight assembly disposed adjacent the second polarizer apparatus.

BRIEF DESCRIPTION OF THE DRAWINGS

So that the manner in which the above recited features can be understood in detail, a more particular description, briefly summarized above, may be had by reference to embodiments. The accompanying drawings relate to embodiments and are described in the following.

DETAILED DESCRIPTION OF EMBODIMENTS

Reference will now be made in detail to die various embodiments, one or more examples of which are illustrated in the figures. Within the following description of the drawings, the same reference numbers refer to same components. Generally, only the differences with respect to individual embodiments are described. Each example is provided by way of explanation and is not meant as a limitation. Further, features illustrated or described as part of one embodiment can be used on or in conjunction with other embodiments to yield yet a further embodiment. It is intended that the description includes such modifications and variations.

Figure 1A:
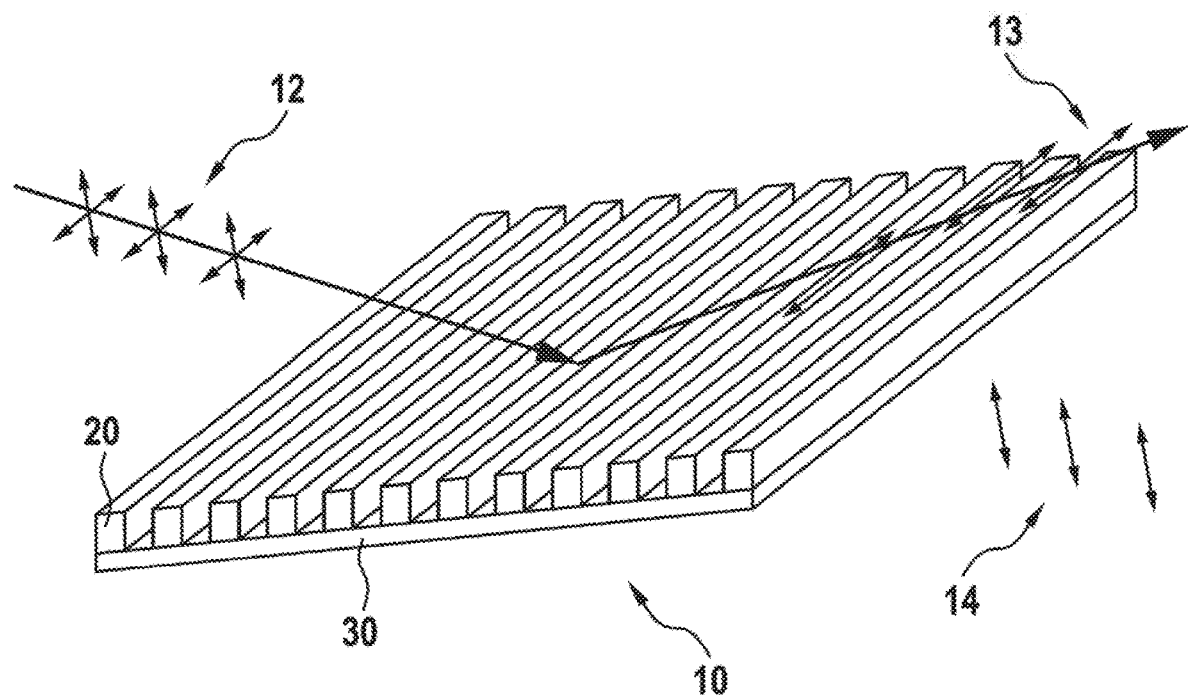
FIG. 1A shows an example of the principle of a wire grid polarizer.

FIG. 1A shows a wire grid polarizer 10. The wire grid polarizer 10 includes a substrate 30. The wire grid polarizer 10 further includes conductive lines 20 forming a wire array. As shown in FIG. 1, unpolarized light 12, which is incident on the wire grid polarizer 10 is polarized. S-plane light 13 is reflected by the wire grid polarizer, whereas p-plane light 14 is transmitted through the wire grid polarizer.

Figure 1B:
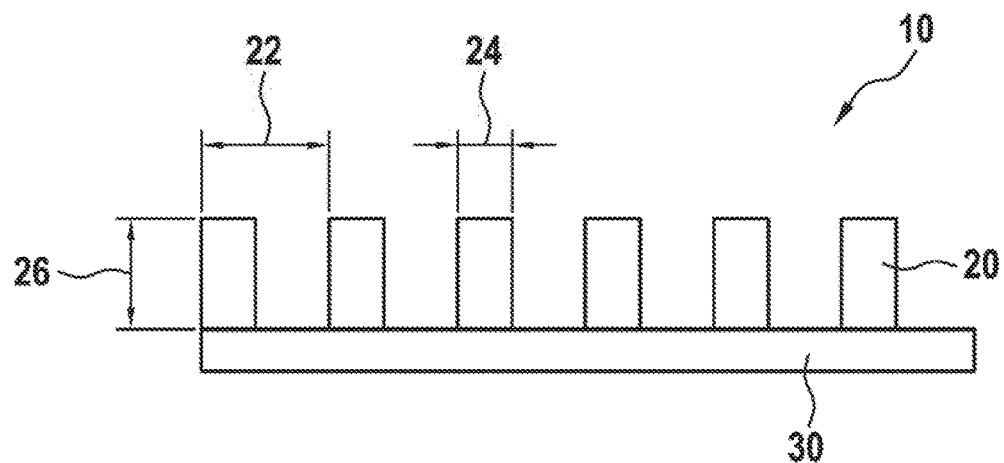
FIG. 1B shows a wire grid polarizer according to embodiments described herein, wherein parameters for optical performance of the wire grid polarizers are illustrated.

FIG. 1B illustrates embodiments of a wire grid polarizer 10. The conductive lines 20 form a wire array of the conductive lines. The conductive lines are provided on a substrate 30, for example a glass substrate. According to some embodiments, which can be combined with other embodiments described herein, the substrate can be a transparent substrate. For example, the transparent substrate can be a glass substrate or a plastic substrate, such as a plastic substrates like PET, PEN, COP, PI, TAC (Triacetyl cellulose) and other similar substrates.

According to some embodiments, the wire array can be defined by the pitch 22 of the wire array, the width 24 of the conductive lines, and/or the height 26 of the conductive lines. The pitch (or period) is beneficially at least three times smaller than the smallest wavelengths to be polarized. According to some embodiments, which can be combined with other embodiments described herein, the pitch of the wire array can be 200 nm or smaller. Further parameters considered for manufacturing a wire grid polarizer can be the duty cycle or fill-factor, i.e. the width 24 of the conductive lines divided by the pitch 22 of the wire grid array, and/or the aspect ratio, i.e. the height 26 of the conductive lines divided by the width 24 of the conductive lines.

A beneficial duty cycle can be determined by a tradeoff between the transmission efficiency for a smaller duly cycle and the capability of manufacturing small duty cycles, for example with imprint lithography. Further, according to some embodiments, which can be combined with other embodiments described herein, an aspect ratio of about 3:1 can be provided. Aspect ratios above 3:1 may be beneficial. However, such aspect ratios above 3:1 may also be more difficult to manufacture. Embodiments described herein provide an improved method for manufacturing wire grid polarizers, wire grid polarizers manufactured with the corresponding method, and display apparatuses having such wire grid polarizers. The improved method allows for a pitch of the wire array of the conductive lines being smaller as compared to the pitch of the patterned resist structure manufactured by a lithography process.

Methods of manufacturing of wire grid polarizers according to embodiments described herein may utilize imprint lithography, maskless lithography, or lithography with a mask. Imprint lithography may be beneficial in order to reduce manufacturing costs, wherein features for manufacturing a wire array can be provided in a sheet-to-sheet process or a roll-to-roll process, such that wire grid arrays can be manufactured on large substrates, for example a large plastic substrate.

As mentioned above, polarizers may be absorptive. Approximately 50% of the light produced by the backlight of an LCD is absorbed by the first polarizer (e.g., the polarizer between the backlight and the LC/TFT layers). In contrast, the polarizers of embodiments of the present disclosure are reflective. Photons with a polarization opposite to that of the reflective polarizer (that would normally be absorbed in an absorptive polarizer) are reflected back into a diffuser plate that may be between the backlight and the lower polarizer. The back reflector of the backlight "re-reflects" the light back through the diffuser which scrambles the polarization of the light so that approximately 50% of this re-reflected light will pass through the first polarizer. The remaining approximately 50% of the re-reflected light would again be reflected off the first polarizer and then off the back reflector and back through the diffuser again to the polarizer with approximately 50% being passed and approximately 50% being reflected. This light recycling repeats until most of or virtually all the light passes through the polarizer with the correct polarization. Prior art methods of "recycling" light that would otherwise be absorbed use expensive additional layers (e.g., Vikuiti™ Reflective Polarizer Films (DBEF) available from 3M Corporation) that add additional cost and thickness to the LCD system. Thus, embodiments of the present disclosure improve the energy efficiency of the LCD without introducing additional expense and stack thickness.

In addition to inefficiency, LCDs may suffer from electrical noise between the various devices that are integrated together within the LCD. Most notably is the electrical noise between the electrical circuits that are used to sense touch on the surface of the LCD (the touch panel) and the circuits within the LCD that control the orientation of the liquid crystals (LC) (e.g., the thin film transistor (TFT) array). It is also possible to have electrical noise generated by several other circuits, including those that control the backlight (e.g., local dimming), those that are associated with other sensors that may be built into the display (e.g., pressure, temperature, light sensors), and other circuits within the device that are not directly display related. Further, newer technologies such as haptic devices that provide simulated tactile feedback to display users include circuitry adjacent to the LC control circuits that can also generate interfering noise. These noise sources constrain the design on the LCD, diminish the sensitivity of the sensors, and can interfere with the operation of devices that use LCDs.

The reflective polarizers of embodiments of the present disclosure also provide shielding of the electromagnetic noise that these various circuits can generate. By using a conductive wire grid (e.g., including an array of parallel fine conductive wires) that is electrically grounded, for example with a grounding frame, the reflective polarizers provide a layer of electrical shielding between the circuits within the LCD that control LC orientation and other outside circuits, which can include, for example, touch sensors, pressure sensors, temperature sensors, light sensors, and other sensors, as well as the circuits that control the backlighting and other devices (e.g., haptic devices) proximate to the LC control circuitry. In some embodiments, the reflective and conductive polarizer can be surrounded by a conductive peripheral border connected to each wire wherein the peripheral border is grounded.

Further, in some embodiments, in addition to the fine wire array, a second coarser grid of reflective, conductive lines can be formed on the film or substrate along with (e.g., overlaid on or integral with) the fine wire array. The coarser grid can be patterned to match and align with the areas of the display that do not align directly with the light emitting portions of the pixels, for example, the black matrix and the TFTs. This further improves the EMI shielding and the reflection of light. In some embodiments, the fine array of reflective, conductive lines (e.g., that provides the polarizing function and shielding) and the coarser grid of reflective, conductive lines aligned with the black matrix and TFTs (e.g., that enhances both the shielding function and the reflecting function) can both be formed concurrently as one grid with different line widths and pitches. In other embodiments, the fine array and the coarse grid can be formed separately but on the same film layer.

Figure 2:
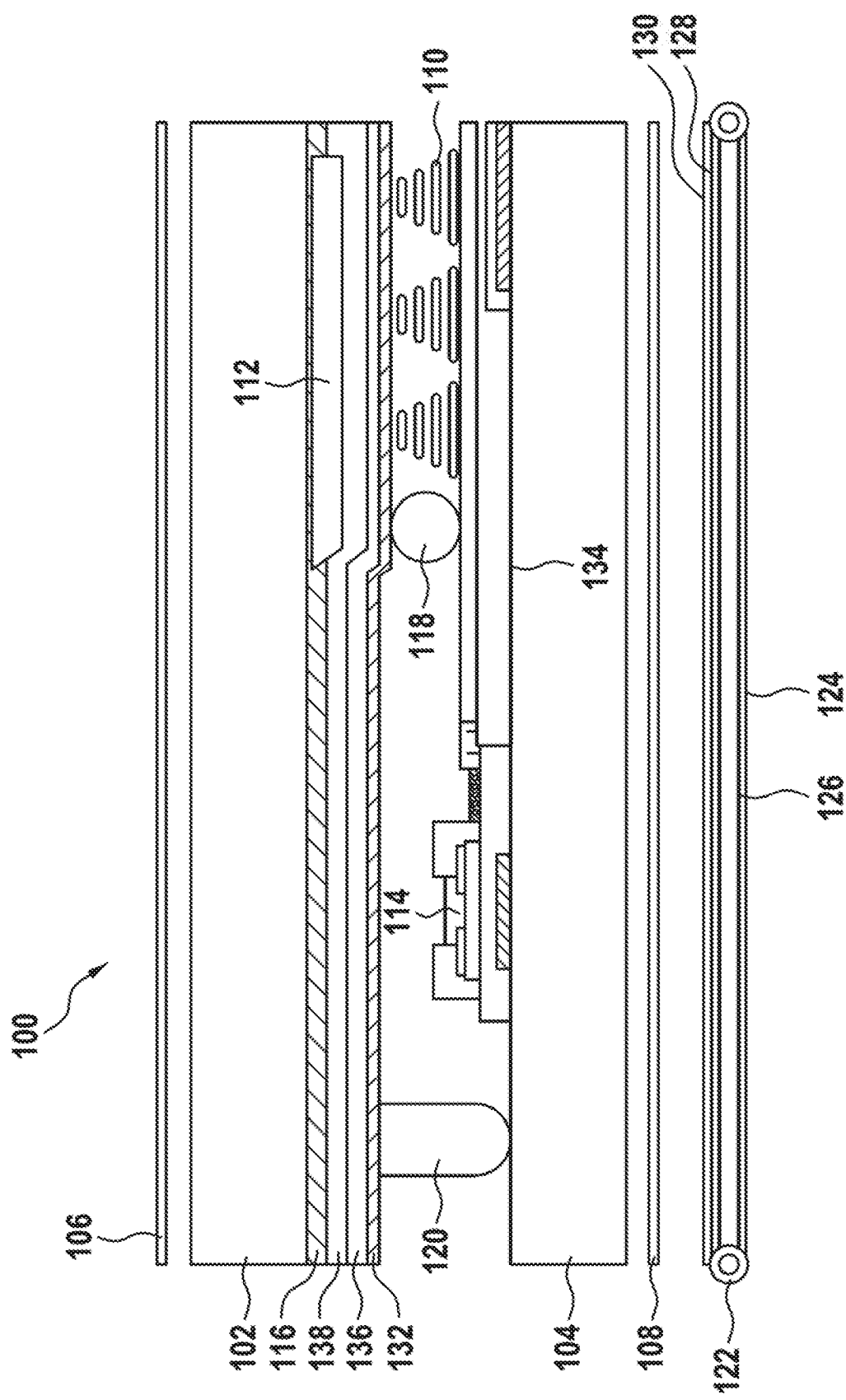
FIG. 2 shows an example of an LCD system to illustrate embodiments of display systems according to embodiments described herein.

Turning now to FIG. 2, a simplified example LCD system 100 according to embodiments of the present disclosure is depicted. The system 100 includes two glass substrates (e.g., upper glass substrate 102 and lower glass substrate 104) between two polarizers (e.g., upper polarizer 106 and lower polarizer 108). Between the glass substrates 102, 104, liquid crystals 110 are disposed below a color filter that includes pixels 112 and TFTs 114 within a black matrix 116. A spacer 118 is used to support and separate the color filter and the upper glass substrate 102 from the lower glass substrate 104. A seal 120 surrounds the liquid crystals 110. Light is provided by a backlight which can include LEDs or CCFL lamp tubes 122 that illuminate a back reflector 124 which passes the light through a light guide plate 126, a prism sheet 128, and the diffuser 130. In some embodiments, the LCD system 100 can include an alignment film 132 above the liquid crystals 110. A layer of row electrodes 134 below the liquid crystals 110 and a layer of column electrodes 136 above the liquid crystals 110 are also included. In some embodiments, the LCD system 100 can include an overcoat film 138 above the column electrodes 136.

As explained above, for embodiments described herein having a wire grid polarizer, light that would have been absorbed by a non-reflective polarizer, is recycled by reflecting back any light that does not pass the lower polarizer 108. In addition, light that does not pass the upper polarizer 106 is reflected back by the upper polarizer 106 and recycled.

Figure 3A:
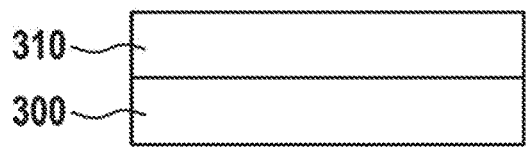
FIGS. 3A to 3F illustrate a fabrication scheme for a method for manufacturing a polarizer apparatus according to embodiments described herein.
Figure 3B:
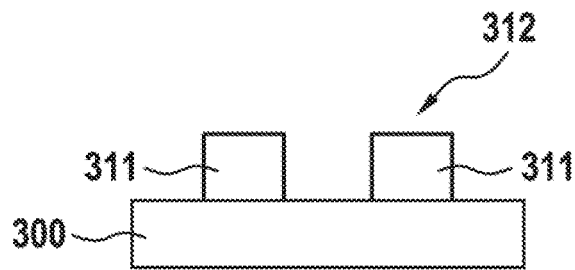
Figure 3C:
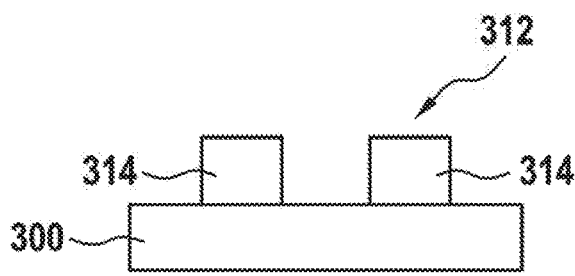

FIGS. 3A to 3F illustrate embodiments for manufacturing a polarizer apparatus according to embodiments described herein. The polarizer apparatus can typically be a wire grid polarizer, wherein a plurality of conductive lines form a wire array. In FIG. 3A the resist layer 310 is provided on a substrate 300. The resist layer 310 can be patterned as shown in FIG. 3B, wherein lines 311 of a patterned resist structure 312 are formed. According to embodiments described herein, the lines have a top surface and two or more side surfaces, particularly to side surfaces extending along the length of the line. As shown in FIG. 3C, the patterned resist structure 312 can be developed, cured, and/or hardened, wherein the lines 314 of the developed resist form an array.

As shown herein, the resist layer 310 can be patterned with imprint lithography (see FIG. 3B) and developed or cured thereafter (see FIG. 3C). However, according to further embodiments, which can be combined with other embodiments described herein, a patterned resist structure may also be formed by mask less lithography or other lithography processes, for example lithography processes utilizing a mask. For lithography processes other than imprint lithography, the resist may be developed with a mask or with another element forming a pattern and the patterned resist structure can be manufactured by removing undeveloped portions of the resist layer 310.

The resulting patterned resist structure may have a width of the lines of 40 nm to 100 nm, a space between the lines of 100 nm to 250 nm, and a height of the lines of 150 nm or above, for example 150 nm to 300 nm. Accordingly, a resist pitch of the line array of the patterned resist structure can be 150 nm or above, for example 220 nm or above. As explained below, according to embodiments described herein, the resist pitch of the line array of the patterned resist structure is larger as compared to a wire pitch of the wire array of the conductive lines. For example, the wire pitch of the conductive lines can be 70% or less of the resist pitch of the fine array of the patterned resist structure. In light thereof, lithography processes can be simplified and/or wire arrays with a pattern that is more difficult to manufacture can be generated by methods described herein.

Figure 3D:
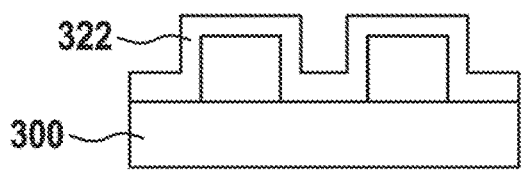

As shown in FIG. 3D, conductive material 322, such as a metal, can be provided over the patterned resist structure. For example, the conductive material 322 can be deposited with a PVD or CVD deposition process. According to some embodiments, which can be combined with other embodiments described herein, the conductive material can be aluminum (Al), silver (Ag), gold (Au), chromium (Cr), copper (Cu), Nickel (Ni), alloys thereof, or similar conductive materials. According to some embodiments, which can be combined with other embodiments described herein, the conductive material 322 can be aluminum having beneficial optical properties in the visible light spectrum for a sub-wavelength metallic grating. For example, the transmission and reflection efficiency for an aluminum wire grid polarizer may show a better uniformity over the visible wavelength range as compared to other materials, such as gold.

According to yet further embodiments, the conductive material 322 may further be covered with the electric material, for example to form a passivation layer. According to yet further embodiments, which can be combined with other embodiments described herein, an etch stop layer (not shown) may be provided before depositing the conductive material 322. The etch stop layer can be a thin layer, for example to protect the resist and the substrate during subsequent processes of material removal.

The conductive material 322 may have a thickness of 30 nm or above, for example 40 nm to 100 nm. By varying the thickness of the conductive material, the duty cycle of the wire grid polarizer can be varied, which, in turn, varies the polarization efficiency of the wire grid polarizer.

As shown in FIGS. 3C and 3D, each of the lines 314 has a top surface and at least two side surfaces, i.e. two side surfaces extending along the length of the line. After deposition, the conductive material 322 covers the top surface and the side surfaces of the lines 314. The patterned resist structure 312 having the lines 314 and the conductive material 322 form a layer structure. According to some embodiments, which can be combined with oilier embodiments described herein, the layer structure may include further layers, for example one or more layers selected from the group consisting of: one or more etch stop layers, passivation layers, and dielectric layers for adapting the optical properties of the wire grid polarizer. Additionally or alternatively, more than one layer of conductive material may be provided according to some embodiments.

Figure 3E:
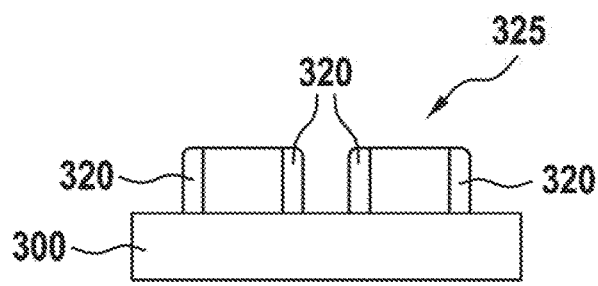

The layer structure is etched as shown in FIG. 3E. Etching the layer structure removes the conductive material 322 from the top surface of the lines 314 of the line array of the patterned resist structure. For example, a material like aluminum can be etched with BCl3 or other etchants. By etching the conductive material, conductive lines 320 are formed.

The conductive lines 320 form a wire array 325. For each of the lines 314 of the patterned resist structure, two conductive lines 320 are formed. The conductive lines 320 correspond to the conductive material provided at the side surfaces of the lines 314. According to some embodiments, which can be combined with other embodiments described herein, the pitch or the average pitch, respectively, of the conductive lines 320 is about 50% of the pitch of the line 314, since for each line 314 two conductive lines 320 are provided. According to some embodiments, the conductive lines form a wire array having a wire pitch of 30% to 70% of the resist pitch, i.e. the pitch of the lines 314 of the patterned resist structure. It is understood that the wire pitch of the wire array can also be referred to as an average pitch, since the fabrication method may result in or allow for essentially two different distances between neighboring conductive line 320, even for a uniform distance between the lines 314 of the patterned resist structure 312.

In light of the above, the methods for manufacturing a polarizer apparatus may also be referred to as a double pattern fabrication, since the conductive lines forming a wire array are doubled as compared to the lines of the line array of the patterned resist structure. In light of the above, the patient of the line array of the patterned resist structure can be more easily manufactured. Further, since the width of the conductive lines is inter alia defined by the layer thickness of the deposited conductive material 322, a higher aspect ratio can be provided, i.e. the aspect ratio is not mainly limited by an aspect ratio possible during fabrication of the patterned resist structure.

As exemplarily shown in FIG. 3E, the conductive lines 320 have a top surface, which is asymmetrically curved after etching the layer structure shown in FIG. 3D. Accordingly, a wire array of optically reflective and electrically conductive lines is formed. The conductive lines have a top surface and two or more side surfaces. As shown in FIG. 3E, the height of the side surface of a conductive line adjacent to the line of the patterned resist structure is higher as compared to a height of an opposing side surface of the conductive line, i.e. the side surface facing away from the line of the patterned resist structure. In light thereof, the optically reflective and electrically conductive lines include at least a first conductive line and an adjacent second conductive line, wherein each of the first conductive line and the adjacent second conductive line have a first height of a first side surface of the two or more side surfaces, which is smaller than a second height of a second side surface of the two or more side surfaces.

As can be seen for example in FIG. 3E, the conductive lines shown in the figure are asymmetric in the cross-section of FIG. 3E. Yet two neighboring conductive lines form a symmetric pair of conductive lines. For example, a pair of two conductive lines 320 at opposing side surfaces of one line 314 are symmetric. As another example, the two lines in the center of FIG. 3E also form a symmetric pair. For example a symmetric pair can have the curve portions of neighboring conductive lines facing away from each other or facing towards each other.

Figure 3F:
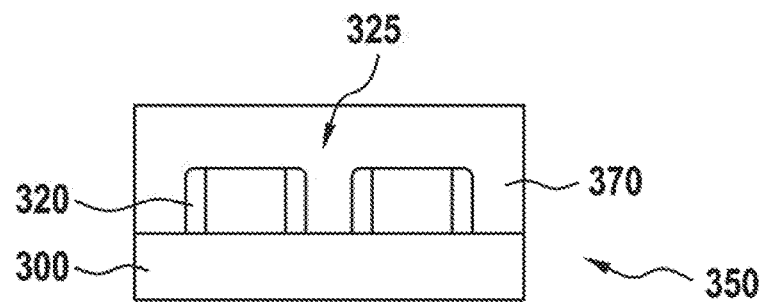

Embodiments of fabrication schemes illustrated and described with respect to FIGS. 3A and 3F may include a deposition of a planarization layer 370, which may also be utilized as a barrier or passivation. According to some embodiments, which can be combined with other embodiments described herein, the planarization layer 370 may have a thickness of 50 nm or above, for example 50 nm to 300 nm. According to an alternative embodiment, which can be combined with other embodiments described herein, the planarization layer 370 may be deposited to a height to fill the gaps between the wire array 325. Accordingly, a polarizer apparatus 350 according to embodiments described herein can be provided.

Figure 4A:
FIGS. 4A to 4G illustrate another fabrication scheme for another method for manufacturing a polarizer apparatus according to embodiments described herein.
Figure 4B:
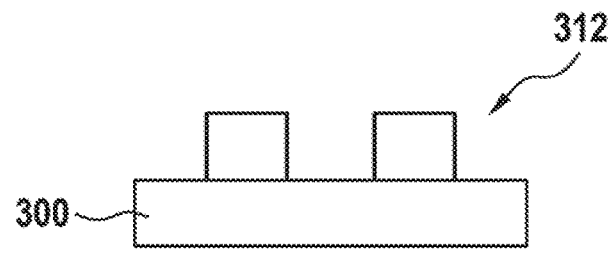
Figure 4C:
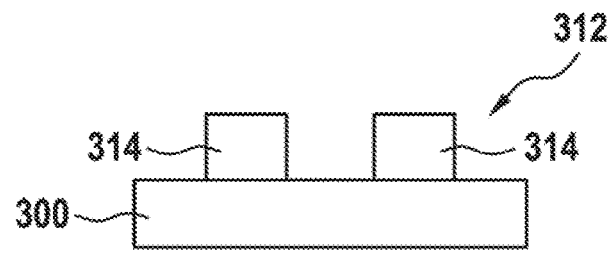
Figure 4D:
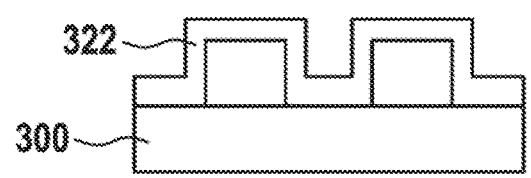
Figure 4E:
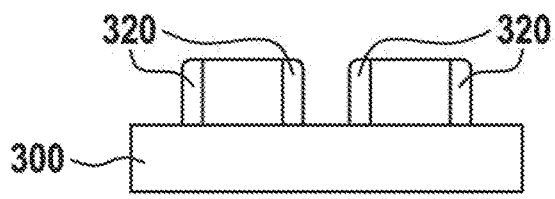
Figure 4F:
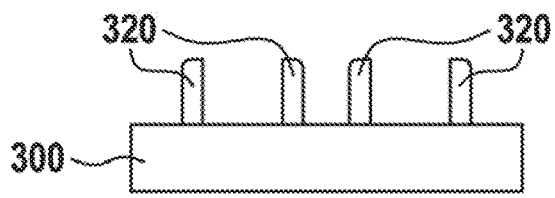

FIGS. 4A to 4G illustrate yet further embodiments of methods for manufacturing polarization apparatus such as a wire grid polarizer according to embodiments described herein. FIGS. 4A to 4F correspond to FIGS. 3A to 3E and FIG. 4G corresponds to FIG. 3F. Details, features, aspects, and embodiments described with respect to FIGS. 3A to 3F can likewise be applied for the embodiments described with respect to FIGS. 4A to 4G. Embodiments described referring to FIGS. 4A to 4G include a further processing illustrated in FIG. 4F. As shown in FIG. 4F, after the etching of FIG. 4E, a further material removal can be provided. Particularly a selective material removal can be provided, wherein the lines 314 of the patterned resist structure are removed from the etched layer structure. The selective material removal results in a structure, wherein remaining resist material is removed and the conductive lines 320 remain on the substrate 300.

The material removal, as exemplarily shown in FIG. 4F can be provided as ashing or cleaning, such as plasma ashing. This may either be a high-temperature ashing (or stripping) process or a descum process, wherein the descum process is provided at lower temperatures.

Figure 4G:
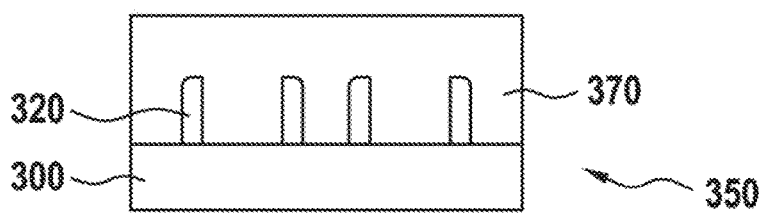

FIG. 4G shows a deposition of a planarization layer 370, which may also be utilized as a barrier or passivation. According to an alternative embodiment, which can be combined with other embodiments described herein, the planarization layer 370 may be deposited to a height to fill the gaps between the conductive lines of the wire array. Accordingly, a polarizer apparatus 350 according to embodiments described herein can be provided.

Figure 5A:
FIGS. 5A to 5H illustrate a further fabrication scheme for a further method for manufacturing a polarizer apparatus according to embodiments described herein.
Figure 5B:
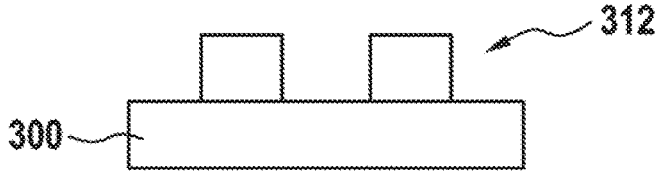
Figure 5C:
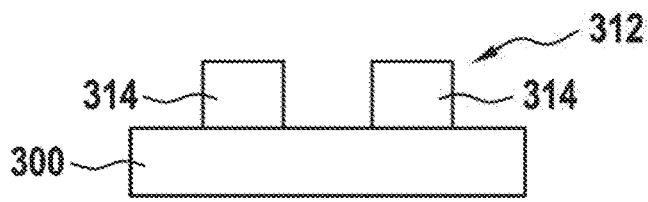
Figure 5D:
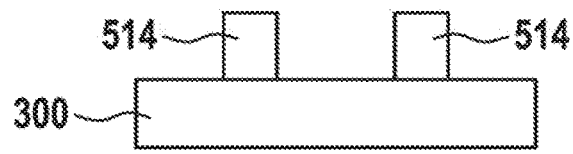

FIGS. 5A to 5H illustrate yet further embodiments of methods for manufacturing polarization apparatus such as a wire grid polarizer according to embodiments described herein. FIGS. 5A to 5C correspond to FIGS. 3A to 3E and FIGS. 5E to 5H correspond to FIGS. 4D to 4G, or in a similar manner to FIGS. 3D to 3F. Details, features, aspects, and embodiments described with respect to FIGS. 3A to 3F and 4A to 4G can likewise be applied for the embodiments described with respect to FIGS. 5A to 5H. Embodiments described referring to FIGS. 5A to 5H include a further processing illustrated in FIG. 5D. FIG. 5D shows a thinning of the lines 314 of the line array of the patterned resist structure 312, which can be conducted according to some embodiments described herein and in combination with other embodiments.

The lines 314 are partially removed such that thinner lines 514 are provided, as shown in FIG. 5D. For example, the lines 314 can have a width of 70 nm to 130 nm and the thinner lines 514 can have a width of 30 nm to 70 nm. Further, the height of the line 314 can be 175 nm to 275 nm, whereas the lines 514 can have a height of 150 nm to 250 nm. According to some embodiments, which can be combined with other embodiments described herein, the thinning of the resist, such as a photoresist, may be conducted with ozone.

Figure 5E:
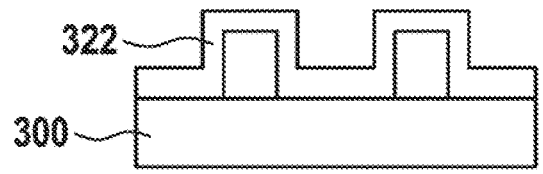
Figure 6A:
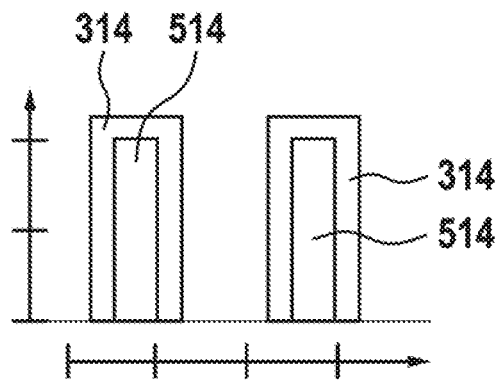
FIGS. 6A to 6C illustrate a fabrication scheme comparable to FIGS. 5A to 5H according to embodiments described herein, wherein further details regarding the wires of a wire grid array are illustrated.

A thinning of the lines of the line array of the patterned resist structures can be provided to more easily manufacture the patterned resist structure 312, as for example shown in FIG. 5C. Further, a thinning of the lines can be utilized to provide predetermined line thicknesses for a subsequent deposition of conductive material 322, as shown in FIG. 5E. A thinning of the lines 314 resulting in a thinner line 514 is also illustrated in FIG. 6A. As can be seen, thinning the resist line array does not alter the pitch of the lines. According to some embodiments, the thinning of the lines can be conducted dependent on the layer thickness of the conductive material 322 deposited over the patterned resist structure. For example, the thinning and/or the material thickness can be controlled to have the uniform pitch of conductive lines 320, i.e. such that neighboring conductive lines forming a pair of conductive lines have about the same distance as compared to a distance to a neighboring pair of conductive lines.

Figure 6B:
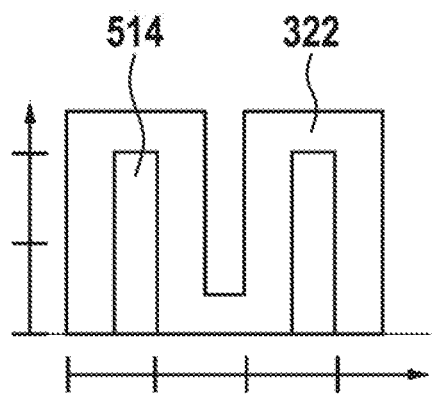

FIG. 6B shows a deposition of conductive material 322 over the lines 514 of the patterned resist structure. As described above, the conductive material 322 can be deposited with a PVD or CVD deposition process. According to some embodiments, which can be combined with other embodiments described herein, the conductive material can be aluminum (Al), silver (Ag), gold (Au), chromium (Cr), copper (Cu), Nickel (Ni), alloys thereof, or similar conductive materials, and particularly aluminum.

Figure 6C:
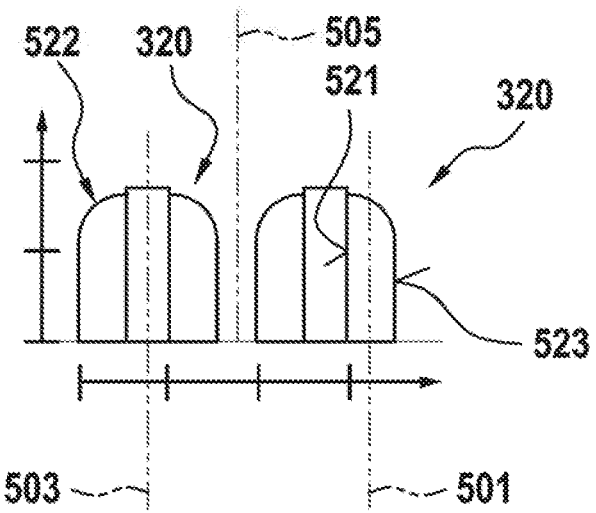

FIG. 6C shows a portion of a wire grid polarizer after etching the layer structure including the patterned resist structure and the conductive material. The conductive lines 320 have a first side surface 521, a second side surface 523, and a curved top surface 522. The curved top surface 522 is asymmetrically curved, particularly with respect to a plane 501 of a conductive line 320. Accordingly, the manufacturing method of wire grid polarizers according to embodiments described herein result in isometric conductive lines 320 having a curved lop surface 522, and wherein the first side surface 521 is higher than a second side surface 523.

Further, due to the manufacturing method according to embodiments described herein, pairs of conductive lines 320 show a symmetry with respect to symmetry planes 503 or 505, respectively. In light of the above, wire grid polarizers manufactured according to embodiments described herein can be identified by the different height in side surfaces (521/523) and/or the asymmetry of the conductive line in combination with the symmetry of pairs of conductive lines.

Figure 7A:
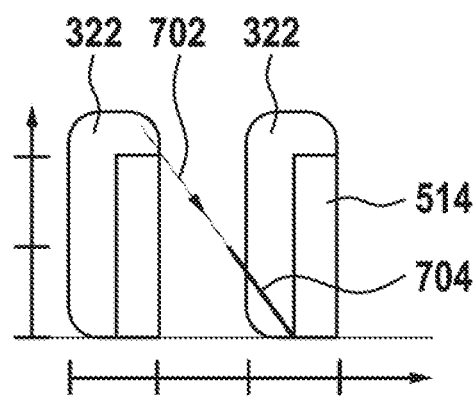
FIGS. 7A to 7C illustrate a fabrication scheme with a deposition method of the conductive material according to embodiments described herein.
Figure 7B:
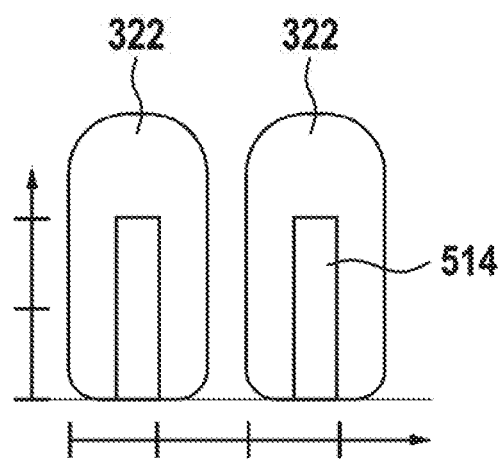
Figure 7C:
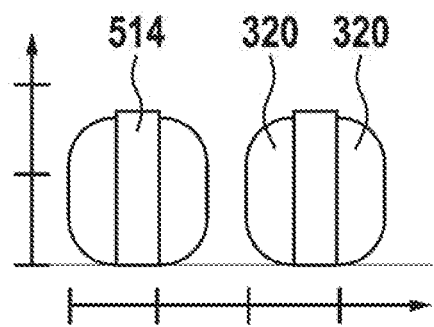

FIGS. 7A to 7C illustrate yet further embodiments for manufacturing a polarizer apparatus, such as a wire grid polarizer. FIG. 7A shows lines 514 of a patterned resist structure, which correspond for example to FIG. 5D. As shown in FIG. 7A by arrow 702, an angular deposition is provided for depositing a conductive material 322 over the line array formed by the lines 514. The angular deposition may result in an overall larger deposition thickness since for a predetermined thickness of conductive materials at a side surface of the line 514, a larger material thickness, which is indicated with reference numeral 704, may be deposited.

According to some embodiments, which can be combined with other embodiments described herein, the angular deposition may be provided at an angle of 15° or above, for example 20° to 50°. Due to the angular deposition, conductive material is mainly deposited on the lines 514 of the patterned resist structure, i.e. the side surfaces and the top surface of the lines. Less or no material is deposited on the substrate.

One option to provide angular deposition can for example be magnetron sputtering, particularly magnetron sputtering from a rotatable cathode, i.e. cylindrical cathode with rotating target material. A magnetron inside the cathode, which provides confinement of sputter plasma, can be tilted to have an angle with respect to a plane perpendicular to a substrate surface. A tilt angle of the magnetron results in tilting of the plasma for sputtering the target material from the target. The tilted plasma results in a main direction of sputter material in a direction, which is not perpendicular to the substrate surface.

As shown in FIG. 7A, conductive material 322 that is deposited on the top surface of the line 514 may shadow material deposition of a portion of the side surface of the conductive line, particularly a portion of the side surface close to the substrate. According to some optional modifications of embodiments described herein, a second deposition of conductive material may be provided at a smaller angle as shown in FIG. 7B. According to some embodiments, which may be combined with other embodiments described herein, the second deposition can be a deposition of further conductive material. This can be the same conductive material as the material of the first deposition. Yet, it may also be possible to deposit a different conductive material in a second or an even further deposition step.

According to some embodiments, which can be combined with other embodiments described herein, an angular deposition for depositing a conductive material on lines 514 of a patterned resist structure is provided from two sides, for example a first side as indicated by arrow 702 (left side) and a second side, which is opposite to the first side (right side) relative to a plane perpendicular to the substrate surface. The first side and the second side may have the same angle relative to the plane perpendicular to the substrate surface or may have different angles on the left and right side.

Figure 5F:
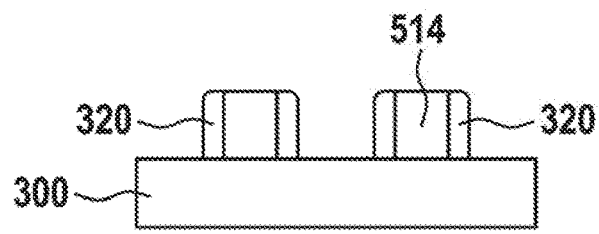
Figure 5G:
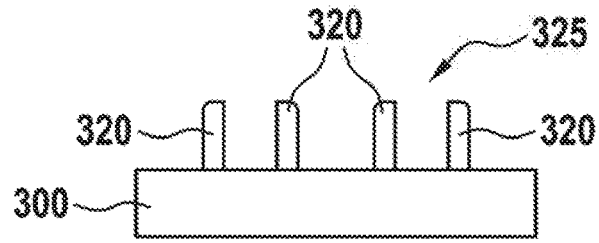
Figure 5H:
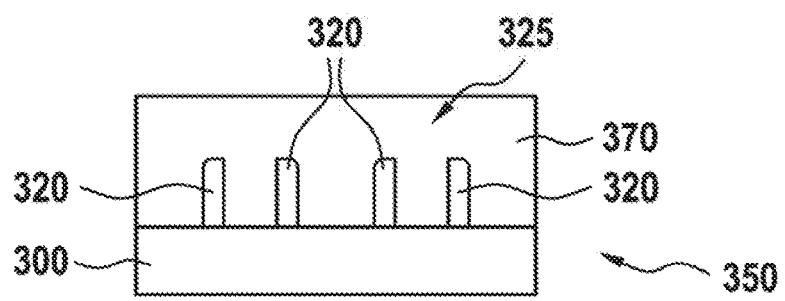

FIG. 7C shows an etching process as previously described with respect to FIGS. 6C, 5F. 4E or 3E. The etching step results in conductive lines forming a wire array as previously described, particularly with respect to FIG. 6E. The wire array forms a polarizer apparatus. The polarizer apparatus can for example be included in a display system 100 shown in FIG. 2, particularly as upper polarizer 106 and lower polarizer 108.

Figure 8:
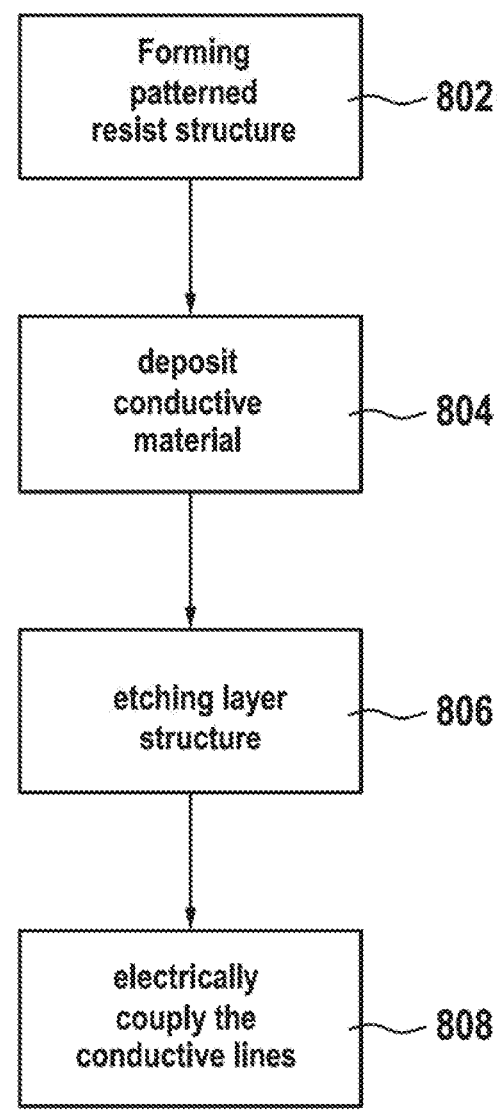
FIG. 8 shows a flowchart illustrating methods for manufacturing a polarizer apparatus according to embodiments described herein.

FIG. 8 shows a flowchart for illustrating a method of manufacturing polarizer apparatuses according to embodiments described herein. Box 802 indicates formation of a patterned resist structure on a substrate. The formation of a patterned resist structure can be provided by coating a resist on the substrate and subsequent patterning of the structure. For example, lines of a line array can be patterned in the resist layer. The patterning can be conducted with imprint lithography. For patterning with imprint lithography, a stamp with a desired pattern is imprinted or embossed into the resist layer. After the resist layer has been imprinted in the desired pattern, the resist is cured or developed. Alternatively, patterning the resist layer may be conducted with maskless lithography, lithography utilizing a mask, or other lithography methods. For such methods, typically the resist is partially developed at the portions forming the desired pattern. Undeveloped resist is removed and the remaining developed resist forms the patterned resist structure.

A conductive material is deposited over the patterned resist structure as indicated by box 804. The conductive material is at least deposited on side surfaces of die lines of the line array of the patterned resist structure and the top surface of the lines. The conductive material and the patterned resist structure form a layer structure, which is further processed as indicated by box 806. According to some optional modifications, the layer structure may further include at least one of an etch stop layer, a passivation layer, a dielectric layer, and a second conductive layer.

Etching the layer structure as illustrated by box 806 results in removal of the conductive material from the lop surface of the lines of the line array. The conductive material at the side surfaces of the lines result in conductive lines forming a wire array of a wire grid polarizer. The conductive lines are electrically coupled as indicated by box 808 to form the wire grid polarizer having the polarization principle, which is for example illustrated with respect to FIG. 1A.

Figure 9:
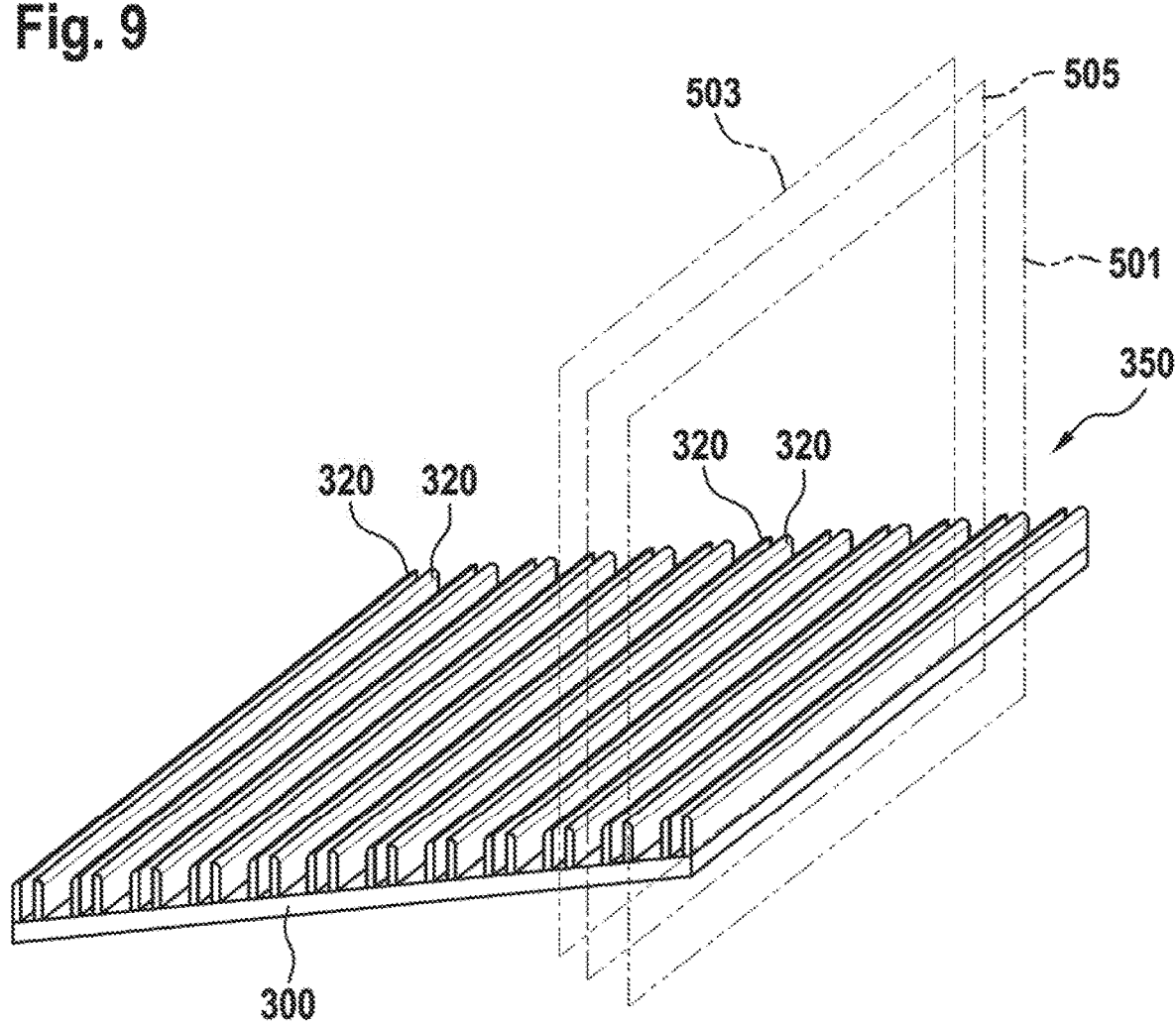
FIG. 9 shows a polarizer apparatus having a wire array of a wire grid polarizer according to embodiments described herein.

As described above, various embodiments of methods for manufacturing a polarizer apparatus, particularly a wire grid polarizer, are provided in the present disclosure. Further, a polarizer apparatus 350 is shown in FIG. 9 is provided. The polarizer apparatus 350 is shown in FIG. 9 and includes a substrate 300 and a plurality of conductive line 320, which form a wire array. The conductive lines of the wire array are electrically coupled, for example by a grounding frame, to generate a wire grid polarizer.

The present disclosure includes several advantages including providing a manufacturing method, a polarizer apparatus, and/or a display system, wherein a pattern of the line array of the patterned resist structure can be more easily manufactured. The improved methods according to embodiments described herein allow for a pitch of the wire array of the conductive lines being smaller as compared to the pitch of the patterned resist structure manufactured by a lithography process. Further, utilizing aluminum can have beneficial optical properties in the visible light Spectrum for a sub-wavelength metallic grating. Imprint lithography may be beneficial in order to reduce manufacturing costs. A beneficial duty cycle can be determined by a tradeoff between the transmission efficiency for a smaller duty cycle and the capability of manufacturing small duty cycles, for example with imprint lithography.

While the foregoing is directed to some embodiments, other and further embodiments may be devised without departing from the basic scope, and the scope is determined by the claims that follow.

The invention claimed is:

1. A method for manufacturing a polarizer apparatus, the method comprising:
   forming a patterned resist structure having lines with a top surface and two or more side surfaces;
   depositing a conductive material over the patterned resist structure, wherein the conductive material is provided at the top surface and the two or more side surfaces, and wherein a layer structure is formed; and
   etching the layer structure to remove the conductive material from the top surface of the lines to form conductive lines of the conductive material at the two or more side surfaces, wherein the conductive lines include at least a first conductive line and an adjacent second conductive line, wherein each of the first conductive line and the adjacent second conductive line have a first height of a first side surface and a second height of a second side surface, wherein the first height is smaller than the second height, wherein each of the first conductive line and the second conductive line have an asymmetrically curved top surface.

2. The method of claim 1, further comprising:
electrically coupling the conductive lines.

3. The method of claim 1, further comprising:
further removing the patterned resist structure.

4. The method of claim 1, further comprising:
providing a planarization layer over and between the conductive lines.

5. The method of claim 1, further comprising:
a second deposition of further conductive material over the conductive material and before etching the layer structure.

6. The method of claim 1, further comprising:
aligning the conductive lines of the polarizer apparatus with a color filter of an LCD system.

7. The method of claim 1, wherein the lines of the patterned resist structure form a line array having a resist pitch of 220 nm or above.

8. The method of claim 7, wherein the conductive lines form a wire array having a wire pitch of 30% to 70% of the resist pitch.

9. The method of claim 1, wherein the patterned resist structure is formed via imprint lithography.

10. The method of claim 2, further comprising:
further removing the patterned resist structure.

11. The method of claim 4, further comprising:
a second deposition of further conductive material over the conductive material and before etching the layer structure.

12. The method of claim 5, further comprising:
aligning the conductive lines of the polarizer apparatus with a color filter of an LCD system.

13. The method of claim 6, wherein the lines of the patterned resist structure form a line array having a resist pitch of 220 nm or above.

* * * * *

UNITED STATES PATENT AND TRADEMARK OFFICE
CERTIFICATE OF CORRECTION

PATENT NO. : 10,877,199 B2
APPLICATION NO. : 16/333664
DATED : December 29, 2020
INVENTOR(S) : Kevin Cunningham et al.

Page 1 of 1

It is certified that error appears in the above-identified patent and that said Letters Patent is hereby corrected as shown below:

In the Specification

Column 1, Line 34, delete "array" and insert -- may --, therefor.

Column 1, Line 38, delete "heal" and insert -- heat --, therefor.

Column 3, Line 32, delete "die" and insert -- the --, therefor.

Column 4, Line 8, delete "duly" and insert -- duty --, therefor.

Column 6, Line 23, delete "mask less" and insert -- maskless --, therefor.

Column 6, Line 41, delete "fine" and insert -- line --, therefor.

Column 7, Line 15, delete "oilier" and insert -- other --, therefor.

Column 7, Line 53, delete "patient" and insert -- pattern --, therefor.

Column 8, Line 13, delete "Yet" and insert -- Yet, --, therefor.

Column 8, Line 37, delete "4F" and insert -- 4E --, therefor.

Column 9, Line 58, delete "lop" and insert -- top --, therefor.

Column 10, Line 56, delete "5F." and insert -- 5F, --, therefor.

Column 11, Line 16, delete "die" and insert -- the --, therefor.

Column 11, Line 25, delete "lop" and insert -- top --, therefor.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*